(12) United States Patent
Lippojoki (10) Patent No.: US 7,685,444 B2
(45) Date of Patent: Mar. 23, 2010

(54) POWER SAVING IN CIRCUIT FUNCTIONS THROUGH MULTIPLE POWER BUSES

(75) Inventor: Ismo Lippojoki, Vantaa (FI)

(73) Assignee: Nokia Corporation, Espoo (FI)

( * ) Notice: Subject to any disclaimer, the term of this patent is extended or adjusted under 35 U.S.C. 154(b) by 618 days.

(21) Appl. No.: 11/413,712

(22) Filed: Apr. 28, 2006

(65) Prior Publication Data

US 2007/0300088 A1  Dec. 27, 2007

(51) Int. Cl.
*G06F 1/26* (2006.01)
*G06F 1/00* (2006.01)

(52) U.S. Cl. ...................... 713/320; 713/300

(58) Field of Classification Search ............ 713/320, 713/300
See application file for complete search history.

(56) References Cited

U.S. PATENT DOCUMENTS

| | | | | |
|---|---|---|---|---|
| 5,305,443 | A | 4/1994 | Franzo | 395/325 |
| 5,471,625 | A | 11/1995 | Mussemann et al. | 395/750 |
| 5,958,056 | A | 9/1999 | Lehmann | 713/310 |
| 6,457,135 | B1 | 9/2002 | Cooper | 713/323 |
| 6,564,332 | B1 | 5/2003 | Nguyen et al. | 713/340 |
| 6,651,178 | B1 * | 11/2003 | Voegeli et al. | 713/300 |
| 6,763,478 | B1 | 7/2004 | Bui | 713/600 |
| 6,928,559 | B1 * | 8/2005 | Beard | 713/300 |
| 7,047,185 | B1 * | 5/2006 | Younes et al. | 704/201 |
| 7,100,062 | B2 | 8/2006 | Nicholas | 713/323 |
| 7,114,038 | B2 | 9/2006 | Orenstien et al. | 711/146 |
| 7,142,996 | B2 * | 11/2006 | Patel et al. | 702/64 |
| 7,334,140 | B2 * | 2/2008 | Jones et al. | 713/300 |
| 2005/0188230 | A1 | 8/2005 | Bilak | 713/300 |
| 2005/0268133 | A1 | 12/2005 | Beard | 713/323 |
| 2008/0232141 | A1 | 9/2008 | Artusi et al. | 363/21.01 |

FOREIGN PATENT DOCUMENTS

EP  1544717 A2  6/2005

OTHER PUBLICATIONS

M. Qadri et al., "Low Power Processor Architectures and Contemporary Techniques for Power Optimization—A Review", Journal of Computers, vol. 4, No. 10, Oct. 2009 pp. 927-942.

* cited by examiner

*Primary Examiner*—Chun Cao
*Assistant Examiner*—Stefan Stoynov
(74) *Attorney, Agent, or Firm*—Harrington & Smith (57) ABSTRACT

A method to manage power in an electronic device having at least one circuit function is provided. The method includes: the at least one circuit function determining a current performance requirement of the at least one circuit function; and the at least one circuit function selecting at least one power bus from a plurality of power buses. Each power bus of the plurality of power buses has a different voltage and the selected at least one power bus provides the current performance requirement with a smallest amount of voltage relative to other one or ones of the plurality of power buses.

23 Claims, 4 Drawing Sheets

POWER SAVING IN CIRCUIT FUNCTIONS THROUGH MULTIPLE POWER BUSES

TECHNICAL FIELD

The teachings in accordance with the exemplary embodiments of this invention relate generally to electronic devices and, more specifically, relate to power saving features in electronic devices.

BACKGROUND

Power management is an important aspect of electronic devices. Conventional electronic devices can require significant power as device components have become more complex and power-intensive. Effective power management becomes even more significant in portable electronic devices, as these devices typically operate on a limited battery supply. It is highly preferable to effectively manage power consumption in a portable electronic device so as to extend the interval of time between battery recharging.

SUMMARY

In an exemplary aspect of the invention, a method is provided to manage power in an electronic device having at least one circuit function. The method includes: the at least one circuit function determining a current performance requirement of the at least one circuit function; and the at least one circuit function selecting at least one power bus from a plurality of power buses. Each power bus of the plurality of power buses has a different voltage and the selected at least one power bus provides the current power requirement with a smallest amount of voltage relative to other one or ones of the plurality of power buses.

In another exemplary aspect of the invention, a computer program product is provided to manage power in an electronic device having at least one circuit function. The computer program product includes program instructions embodied on a tangible computer-readable medium. Execution of the program instructions results in operations including: the at least one circuit function determining a current performance requirement of the at least one circuit function; and the at least one circuit function selecting at least one power bus from a plurality of power buses. Each power bus of the plurality of power buses has a different voltage and the selected at least one power bus provides the current performance requirement with a smallest amount of voltage relative to other one or ones of the plurality of power buses.

In a further exemplary aspect of the invention, an electronic device is provided. The electronic device includes: at least one memory; at least one data processor coupled to the at least one memory; at least one power supply coupled to the at least one data processor; and at least one circuit function coupled to the at least one data processor and the at least one power supply. The at least one data processor is configured to execute a program of machine-readable instructions capable of performing the operations of: the at least one circuit function determining a current performance requirement of the at least one circuit function; and the at least one circuit function selecting at least one power bus from a plurality of power buses. Each power bus of the plurality of power buses has a different voltage and the selected at least one power bus provides the current performance requirement with a smallest amount of voltage relative to other one or ones of the plurality of power buses.

In another exemplary aspect of the invention, a method for managing power in an electronic device having at least one circuit function is provided. The method includes: means for the at least one circuit function determining a current performance requirement of the at least one circuit function; and means for the at least one circuit function selecting at least one power bus from a plurality of power buses. Each power bus of the plurality of power buses has a different voltage and the selected at least one power bus provides the current performance requirement with a smallest amount of voltage relative to other one or ones of the plurality of power buses.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Conventional software and hardware platforms for mobile electronic devices often utilize power management capabilities. However, conventional mobile electronic devices generally use low leakage technology. Thus, conventional power management techniques are generally not well suited for high leakage technology (e.g. high leakage integrated circuit processes such as application-specific integrated circuits ("ASICs" or "ASIC" in the singular) based on high leakage technology, for example) when using burst operations for lengthy periods of time. When using high leakage technology, leakages become the dominant factor in power consumption.

It would therefore be desirable to provide techniques for effective power management that are effective in conjunction with high leakage technology. Generally, electronic devices, and particularly mobile electronic devices, need to deliver high performance. This high performance can be achieved by employing high leakage technology wherein power consumption is increased but the device is always on (e.g. connected) and is capable of more burst operations for longer periods of time. However, the use of high leakage technology creates power management challenges for software-operated power management. All transistors leak power whether or not they are clocked, but leakages drop considerably with voltage. Hence, by lowering the operating voltage one can more effectively manage power consumption. In so doing, it is desirable to utilize faster power management techniques rather than slower ones so as to retain effective burst operations. In addition, it is also desirable to provide power management techniques that operate independently of software since the hardware of the electronic device is likely to be static, while the software may be variable.

One conventional approach to power management is to divide system functions into smaller "power islands" with the power for each island being capable of independent on/off control. Although this approach can be effective for achieving low power consumption modes of operation, the approach requires knowledge of the status of the system and prediction logic to forecast future events. This approach is software dependent and relatively slow. Hence, this approach is not optimal for effective power management when using high leakage technology and in burst operations for lengthy periods of time such as those commonly employed in mobile terminals (e.g. modems, cameras, cellular phones).

Another conventional approach utilizes dynamic voltage and clock control for power management. This approach requires an advanced information gathering system to ascertain the current processing load for different sub-functions. Then, based on the gathered information, software regulates the voltage and clock speed, the voltage being a global variable in the system. Similar to the first conventional approach, this approach is not optimal for effective power management when using high leakage technology and in burst operations for lengthy periods of time as it is software reliant and relatively slow in its control mechanism.

Thus, it would be desirable to provide techniques for effective power management that are effective in conjunction with high leakage technology, software independent and relatively fast so as to be suitable for use in burst operations. The exemplary embodiments of this invention provide multiple voltages to different circuit functions. Each circuit function analyzes its own current processing load, it being assumed that power consumption correlates with processing load. If the processing load of the circuit function is low enough, the circuit function is switched to a lower voltage and the clock frequency may be reduced. In such a manner, the power for each circuit function is managed independent of other circuit functions. The power management in accordance with exemplary embodiments of this invention can react in a rapid manner, with the operation of the circuit functions being changed quickly enough such that no software support is needed, except perhaps for initialization. Exemplary embodiments of the invention enable circuit functions to remain in a lower voltage state for longer periods of time, thus reducing the overall power consumption of the electronic device and extending the operational time of portable electronic devices.

Figure 1:
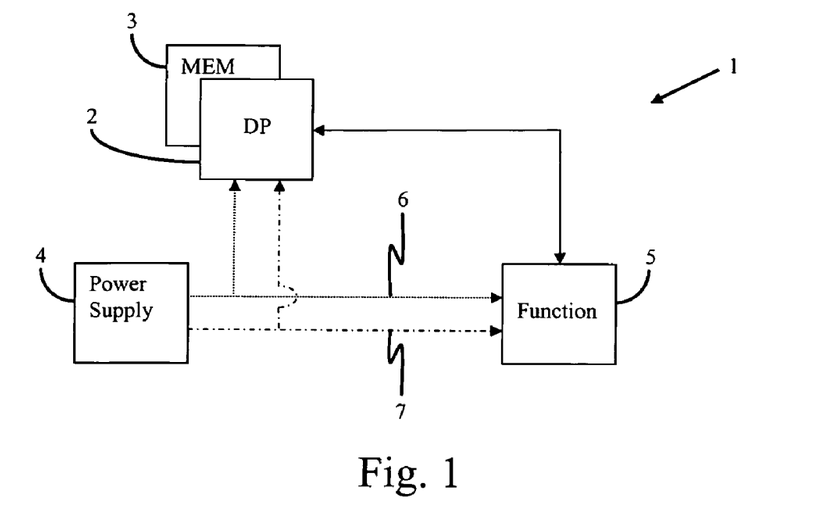
FIG. 1 shows a simplified block diagram illustrating one non-limiting example of an electronic device that is suitable for use in practicing the exemplary embodiments of the invention.

Referring to FIG. 1, a simplified block diagram is shown illustrating one non-limiting example of an electronic device 1 that is suitable for use in practicing the exemplary embodiments of the invention. In FIG. 1, the electronic device 1 includes a data processor (DP) 2 coupled to a memory (MEM) 3, a power supply 4 and a circuit function 5 coupled to the DP 2. The power supply 4 provides two voltages of power by means of two power buses 6, 7. The two power buses 6, 7 provide a lower voltage through a first power bus 6 and a higher voltage through a second power bus 7. The DP 2 and circuit function 5 are coupled to both power buses 6, 7. The DP 2 and the circuit function 5 are capable of switching between the two power buses 6, 7 based on a determined performance requirement of the respective component.

Figure 2:
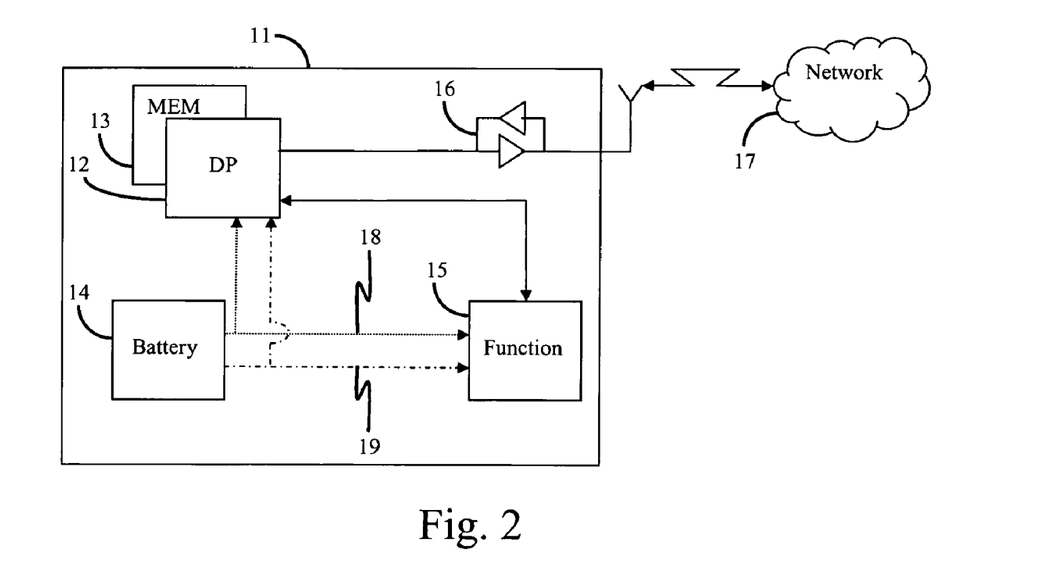
FIG. 2 shows a simplified block diagram illustrating another non-limiting example of a portable electronic device that is suitable for use in practicing the exemplary embodiments of the invention.

Referring to FIG. 2, a simplified block diagram is shown illustrating one non-limiting example of a portable electronic device 11 that is suitable for use in practicing the exemplary embodiments of the invention. In FIG. 2, the electronic device 11 includes a data processor (DP) 12 coupled to a memory (MEM) 13, a battery 14, a circuit function 15 coupled to the DP 12 and a transceiver 16 coupled to the DP 12. The battery 14 provides two voltages of power by means of two power buses 18, 19. The two power buses 18, 19 provide a lower voltage through a first power bus 18 and a higher voltage through a second power bus 19. The DP 12 and circuit function 15 are coupled to both power buses 18, 19. The DP 12 and the circuit function 15 are capable of switching between the two power buses 18, 19 based on a determined performance requirement of the respective component. The transceiver 16 enables the portable electronic device 11 to communicate with a wireless network 17. In alternate embodiments, the transceiver 16 may enable the portable electronic device 11 to communicate with a local area network, as a non-limiting example.

In general, the various embodiments of the portable electronic device 11 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The circuit function 5, 12 of the electronic devices 1, 11 shown in FIGS. 1 and 2 may be a logical circuit function, an analog circuit function or a combination of a logical circuit function and an analog circuit function. The memory 3, 13 may be of any type suitable to the local technical environment and may be implemented using any suitable data storage technology, such as semiconductor-based memory devices, magnetic memory devices and systems, optical memory devices and systems, fixed memory and removable memory. The data processor 2, 12 may be of any type suitable to the local technical environment, and may include one or more of general purpose computers, special purpose computers, microprocessors, digital signal processors (DSPs), video and graphics engine processors and processors based on a multi-core processor architecture, as non-limiting examples.

In other embodiments, the electronic devices 1, 11 of FIGS. 1 and 2 may include more than one memory, power supply/battery, data processor and/or circuit function. In further embodiments, the electronic devices 1, 11 of FIGS. 1 and 2 may include other components, such as programs or program code stored in the memory, one or more keypads, one or more display devices and/or one or more sound devices, as non-limiting examples. In other embodiments, the power supply 4 and battery 14 in the electronic devices 1, 11 of FIGS. 1 and 2 may be capable of providing more than two different voltages to the circuit functions 5, 15. In such embodiments, more than two power buses may be utilized to provide the more than two different voltages.

Figure 3:
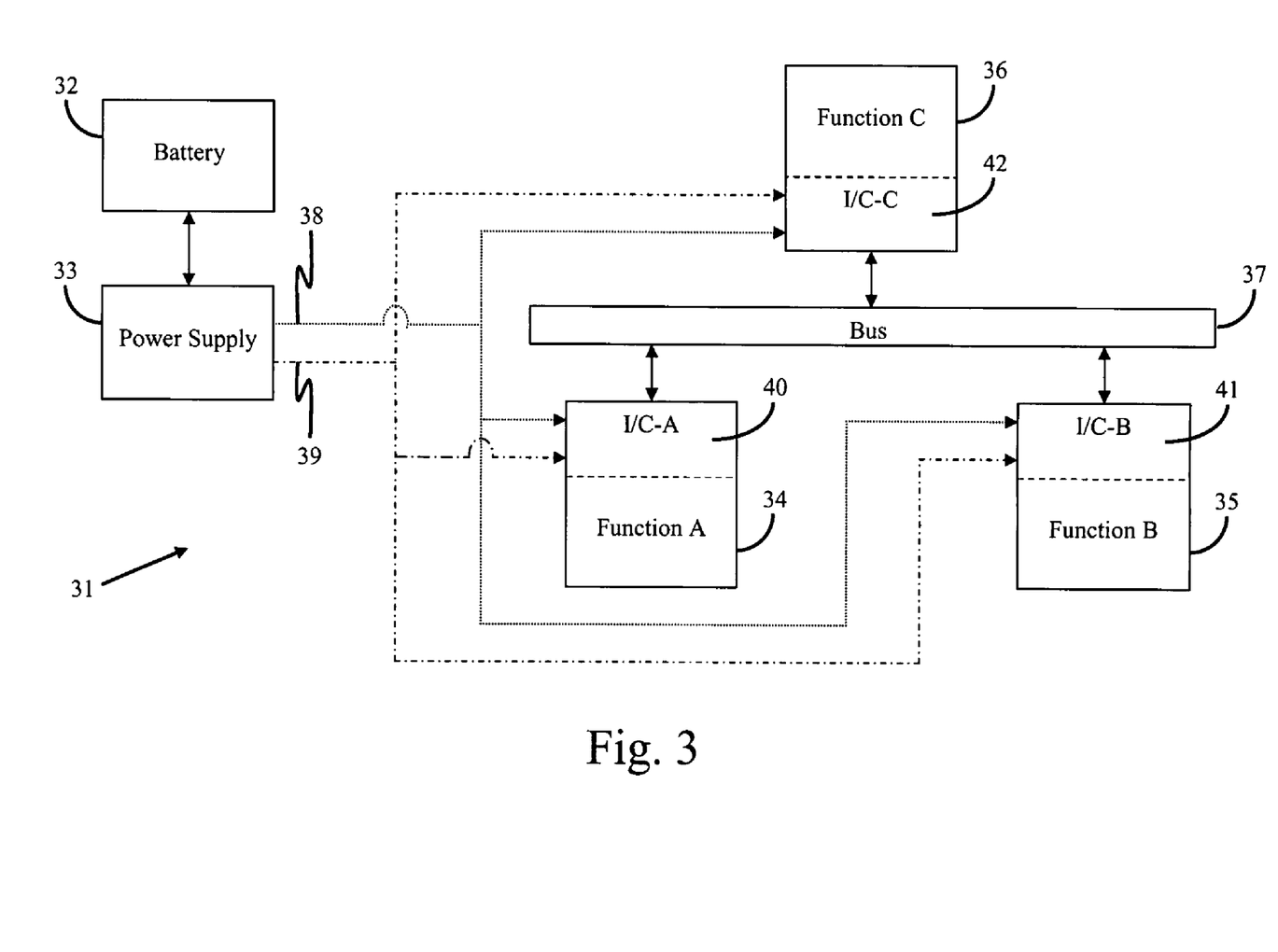
FIG. 3 shows a simplified block diagram illustrating another non-limiting example of an electronic device that is suitable for use in practicing the exemplary embodiments of the invention.

Referring to FIG. 3, a simplified block diagram is shown illustrating one non-limiting example of an electronic device 31 that is suitable for use in practicing the exemplary embodiments of the invention. In FIG. 3, the electronic device 31 includes a battery 32, a power supply 33 coupled to the battery 32 and three circuit functions 34, 35, 36 coupled to a common bus 37. The three circuit functions 34, 35, 36 include circuit function A 34, circuit function B 35 and circuit function C 36. Each circuit function 34, 35, 36 contains an interface-control (I/C) 40, 41, 42. The I/C serves as an interface, power control and clock control for its respective circuit function. The power supply 33 provides two voltages of power by means of two power buses 38, 39. The two power buses 38, 39 provide a lower voltage through a first power bus 38 and a higher voltage through a second power bus 39. Each circuit function 34, 35, 36 is coupled to both power buses 38, 39 through the respective I/C 40, 41, 42 of the circuit function. The I/C 40, 41, 42 of each circuit function 34, 35, 36 analyzes the processing load on the respective circuit function 34, 35, 36 and determines the current performance requirement of the respective circuit function 34, 35, 36. If it is determined that the current performance requirement of the circuit function 34, 35, 36 can be met by the higher voltage provided by the second power bus 39, the respective I/C 40, 41, 42 switches the power used by that circuit function 34, 35, 36 to the higher voltage provided by the second power bus 39 if the circuit function 34, 35, 36 is not currently using the higher voltage. The I/C 40, 41, 42 also switches the clock frequency to a higher clock frequency if the respective circuit function 34, 35, 36 is not currently using the higher clock frequency. If it is determined that the current performance requirement of the circuit function 34, 35, 36 can be met by the lower voltage provided by the first power bus 38, the respective I/C 40, 41, 42 switches the power used by that circuit function 34, 35, 36 to the lower voltage provided by the first power bus 38 if the circuit function 34, 35, 36 is not currently using the lower voltage. The I/C 40, 41, 42 also switches the clock frequency to a lower clock frequency if the respective circuit function 34, 35, 36 is not currently using the lower clock frequency.

The bus 37 may or may not always be at the same voltage level. In other embodiments, the voltage level of the bus 37 may be dependent on the voltage levels of the circuit functions 34, 35, 36 connected to the bus 37.

Figure 4:
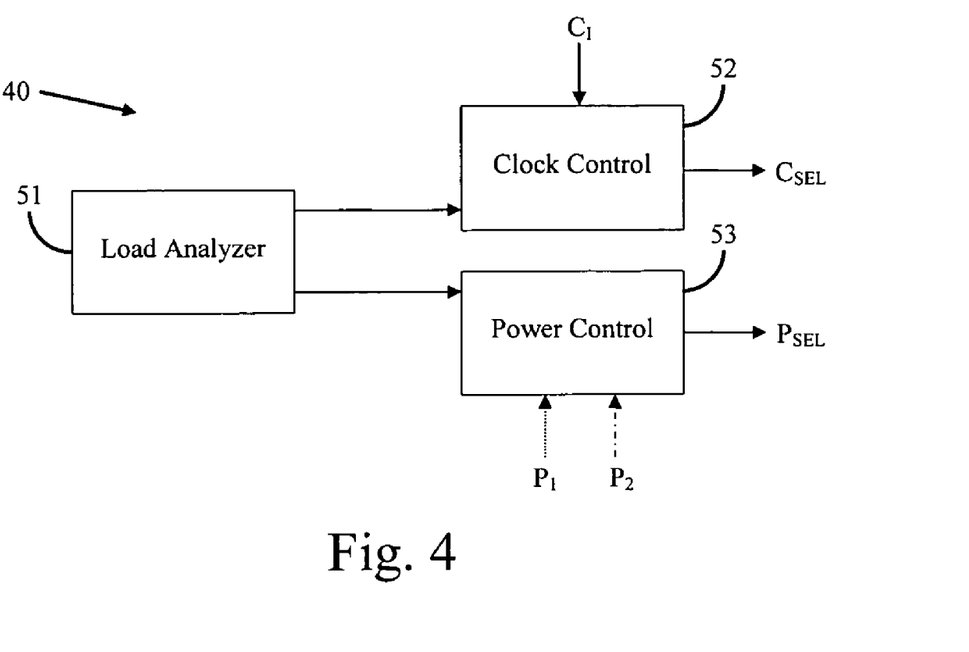
FIG. 4 shows a simplified block diagram illustrating one non-limiting example of a portion of the components of an interface-control A (I/C-A) 40 of FIG. 3.

Referring also to FIG. 4, a simplified block diagram is shown illustrating one non-limiting example of a portion of the components of the interface-control A (I/C-A) 40 of FIG. 3. The I/C-A 40 includes a load analyzer 51 coupled to a clock control 52 and a power control 53. The I/C-A 40 has a register (not shown) for settings (e.g. voltage and/or clock settings) that is initially set by software. Subsequently, the load analyzer 51 of circuit function A 34 analyzes the processing load on circuit function A 34 and determines the current performance requirement of circuit function A 34. The load analyzer 51 then sends the appropriate instruction to the clock control 52 and power control 53. The clock control 52 has one clock input $C_1$. The clock control 52 internally divides the clock input $C_1$ to provide the desired (e.g. selected) clock frequency $C_{SEL}$ as an output. The clock control 52, internally, may also provide clock gating to further reduce power consumption. The power control 53 selects the appropriate power, as from available voltages $P_1$, $P_2$ provided by the power buses 38, 39, and provides the selected power $P_{SEL}$ as an output. The subsequent power management (e.g. voltage and clock adjustments) is performed by the I/C-A 40 of circuit function A 34 in real time and independent of software. The example components of IC-A 40 shown in FIG. 4 are similar to the example components of the other interface-controls I/C-B 41 and IC-C 42.

As noted above, the load analyzer 51 analyzes the processing load on circuit function A 34 and determines the current performance requirement of circuit function A 34. In other embodiments, the load analyzer may consider other criteria such as the current amount of data flow, the current input/output (I/O) requirements, the current number of processor instructions being executed per unit of time, the data buffer state, the command buffer state, the percentage of idle operations, and an amount of buffered input or output data, as non-limiting examples. In addition, the load analyzer 51 may also consider one or more signals or conditions external to the integrated circuit.

In other embodiments, software may set the rules which the I/C of the circuit function follows in determining whether or not to change the voltage and/or clock frequency based on the current performance requirement of the circuit function. The actual changing of the voltage and/or clock frequency in response to such preset rules may be accomplished by hardware in the circuit function. In further embodiments, software may set minimum or maximum performance states for the circuit function.

The current performance requirement determination and operational frequency and voltage changes effected by the I/C can be performed in a rapid manner with relatively few latency issues and no software overhead. The power management techniques of the invention are transparent to software. The current performance requirement determination may be based on measured values or future estimations based on the history for that circuit function. In a preferred embodiment, the current performance requirement determination is based on measured values.

Typical circuit functions (e.g. modules) in conventional electronic devices have a small internal capacitance that causes a per-function delay (e.g. latency) when increasing performance (e.g. increasing voltage). This per-function delay is relatively small when compared to a similar system delay the entire device experiences when changing voltage levels on a system-wide basis. The larger system delay is due to the greater overall capacitance of the system as compared to the smaller internal capacitance of the circuit functions. The per-function delay also depends on the current drive capability. Due to this per-function delay, it may be preferable to reduce the clock frequency prior to changing the voltage when shifting from a higher voltage to a lower voltage. Similarly, it may be preferable to change the voltage prior to increasing the clock frequency when shifting from a lower voltage to a higher voltage.

In further embodiments, the electronic device 31 of FIG. 3 may include more than one battery and/or more than one power supply. In other embodiments, the electronic device 31 of FIG. 3 may include more than three circuit functions or less than three circuit functions. In further embodiments, more than two voltages may be provided by the power supply 33. In such embodiments, more than two power buses may be utilized to provide the more than two voltages. In other embodiments, a device-wide power manager may be employed in conjunction with exemplary embodiments of the invention. Non-limiting examples of operations a device-wide power manager may be enabled to perform include: tuning circuit function configurations and monitoring and responding to specific device or circuit function limitations or problems (e.g. overheating, low battery charge).

As a non-limiting example, the circuit functions shown in FIGS. 1-3 may be located in individual integrated circuits or ASICs with each circuit function located in a separate integrated circuit or ASIC. As additional non-limiting examples, the circuit functions may be sub-functions located within the same integrated circuit or ASIC or the circuit functions may be a combination of circuit functions and sub-functions with some located in individual integrated circuits or ASICs and others located in the same integrated circuit or ASIC. As non-limiting examples of this architecture, the three circuit functions of FIG. 3, functions A, B and C: may be located in three different ASICs, ASIC A, ASIC B and ASIC C; may be located all within the same ASIC, ASIC ABC; or may be located in two different ASICs, ASIC AB and ASIC C, such that ASIC AB contains circuit functions A and B while ASIC C contains circuit function C.

Figure 5:
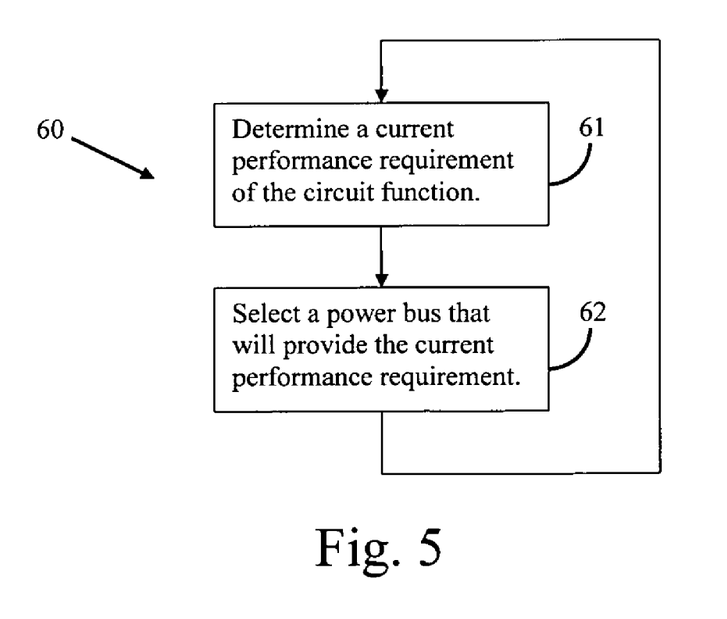
FIG. 5 is a logic flow diagram that illustrates a method for practicing the exemplary embodiments of the invention.

Referring to FIG. 5, a method 60 is shown for practicing the exemplary embodiments of the invention. The method is for managing power in an electronic device having at least one circuit function and includes the following steps. In box 61, the at least one circuit function determines a current performance requirement of the at least one circuit function. In box 62, the at least one circuit function selects at least one power bus from a plurality of power buses, each bus of the plurality buses having a different voltage. The selected at least one power bus will provide the current performance requirement with the smallest amount of voltage relative to other one or ones of the plurality of power buses. This is an iterative procedure with the method repeatedly progressing back to box 61 to determine the current performance requirement of the at least one circuit function.

Figure 6:
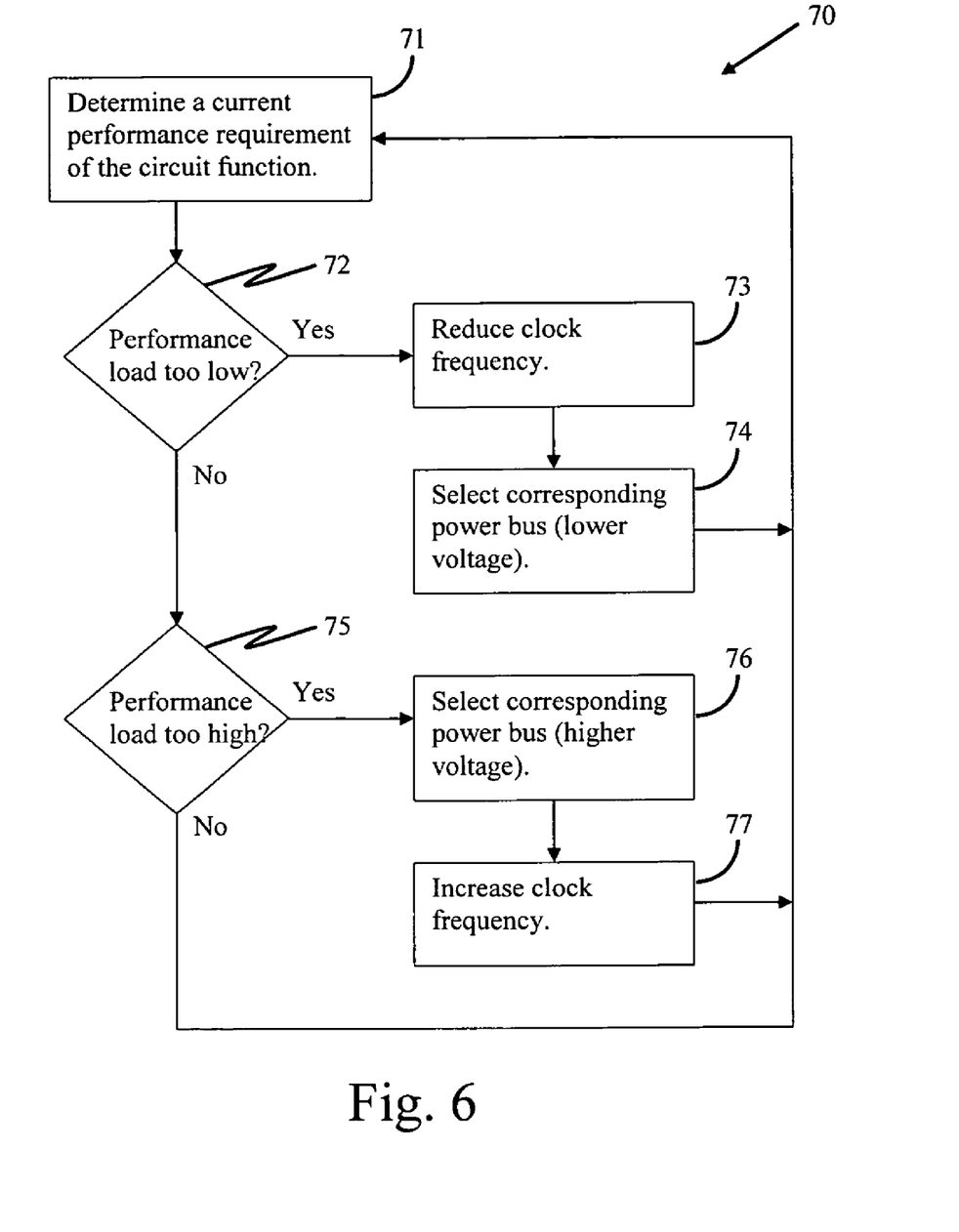
FIG. 6 is a logic flow diagram that illustrates another method for practicing the exemplary embodiments of the invention.

Referring to FIG. 6, another method 70 is shown for practicing the exemplary embodiments of the invention. The method 70 is for managing power in an electronic device having at least one circuit function and includes the following steps. In box 71, the at least one circuit function determines a current performance requirement of the at least one circuit function. In box 72, the method 70 inquires whether the current performance load on the circuit function is too low as compared with the determined current performance requirement of box 71 and internal settings, as explained above. If the performance load is too low, in box 73 the clock frequency is reduced. In box 74, a corresponding power bus from a plurality of power buses is selected to provide the circuit function with a lower voltage. The power bus selected and accompanying voltage provided is designed to meet the current performance requirement with a smallest amount of voltage relative to other one or ones of the plurality of power buses. As this method 70 is iterative, from box 74 the method 70 returns to box 71. If the performance load is not too low, then from decision box 72 the method 70 proceeds to decision box 75. In box 75, the method 70 inquires whether the performance load on the circuit function is too high as compared with the determined current performance requirement of box 71 and internal settings, as explained above. If the performance load is too high, in box 76 a corresponding power bus from the plurality of power buses is selected to provide the circuit function with a higher voltage. The power bus selected and accompanying voltage provided is designed to meet the current performance requirement with a smallest amount of voltage relative to other one or ones of the plurality of power buses. After the voltage is settled, in box 77 the clock frequency is increased. As this method 70 is iterative, from box 77 the method 70 returns to box 71. Other embodiments of the method 70 may include an update inquiry step prior to an iteration reinitializing at box 71. In such a manner, the method may require an update (e.g. that another iteration be run starting from box 71) based on a preset or variable time delay, as a non-limiting example. As an additional non-limiting example, the method may require an update based on other criteria such as the electronic device being turned on or certain keys on a keypad of the electronic device being pressed.

The embodiments of this invention may be implemented by computer software or by hardware circuitry, or by a combination of software and hardware circuitry. Further in this regard it should be noted that the various blocks of the logic flow diagram of FIGS. 5 and 6 may represent program steps, or interconnected logic circuits, blocks and functions, or a combination of program steps and logic circuits, blocks and functions for performing the specified tasks.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   determining, by a circuit function, a performance requirement of the circuit function; and
   selecting, by the circuit function, at least one power bus from a plurality of power buses, wherein each power bus of the plurality of power buses has a different voltage and wherein the selected at least one power bus provides the determined performance requirement with a smallest amount of power relative to other one or ones of the plurality of power buses, where the steps of determining and selecting are performed by the circuit function such that power for the circuit function is managed by the circuit function independently of other modules and circuit functions.

2. The method of claim 1, further comprising: operating a clock of the circuit function at a clock frequency that corresponds to the determined performance requirement of the circuit function.

3. The method of claim 1, wherein the performance requirement of the circuit function is determined based on at least one of: a processing load of the circuit function, an amount of data flow in the circuit function, a data buffer state, a command buffer state and a percentage of idle operations.

4. The method of claim 1, wherein the circuit function is one of a plurality of circuit functions and wherein the plurality of circuit functions is located in at least one integrated circuit.

5. The method of claim 1, wherein the circuit function comprises a first circuit function of a plurality of circuit functions in an apparatus, wherein the plurality of circuit functions further comprises a second circuit function, the method further comprising:
   determining, by the second circuit function, a current performance requirement of the second circuit function; and
   selecting, by the second circuit function, at least one power bus from the plurality of power buses, wherein the selected at least one power bus provides the current performance requirement with a smallest amount of voltage relative to other one or ones of the plurality of power buses, where the steps of determining and selecting are performed by the second circuit function such that power for the second circuit function is managed by the second circuit function independently of other modules and circuit functions.

6. The method of claim 1, wherein the circuit function comprises one component of a plurality of components in an apparatus and wherein the circuit function does not perform the steps of determining and selecting for another component of the apparatus.

7. A computer-readable medium tangibly embodying program instructions, the computer-readable medium comprising a component of a circuit function, execution of the program instructions resulting in operations comprising:
   determining, by the circuit function, a performance requirement of the circuit function; and
   selecting, by the circuit function, at least one power bus from a plurality of power buses, wherein each power bus of the plurality of power buses has a different voltage and wherein the selected at least one power bus provides the determined performance requirement with a smallest amount of power relative to other one or ones of the plurality of power buses, where the operations of determining and selecting are performed by the circuit function such that power for the circuit function is managed by the circuit function independently of other modules and circuit functions.

8. The computer-readable medium of claim 7, execution of the program instructions resulting in operations further comprising: operating a clock of the circuit function at a clock frequency that corresponds to the determined performance requirement of the circuit function.

9. The computer-readable medium of claim 7, wherein the performance requirement of the circuit function is determined based on at least one of: a processing load of the circuit function, an amount of data flow in the circuit function, a data buffer state, a command buffer state and a percentage of idle operations.

10. The computer-readable medium of claim 7, wherein the circuit function is one of a plurality of circuit functions and wherein the plurality of circuit functions is located in at least one integrated circuit.

11. The computer-readable medium of claim 7, wherein the circuit function comprises one component of a plurality of components in an apparatus and wherein the program instructions of the circuit function do not perform the operations of determining and selecting for another component of the apparatus.

12. A circuit function comprising:
   means for determining a performance requirement of the circuit function; and
   means for selecting at least one power bus from a plurality of power buses, wherein each power bus of the plurality of power buses has a different voltage and wherein the selected at least one power bus provides the determined performance requirement with a smallest amount of power relative to other one or ones of the plurality of power buses, where the means for determining and the means for selecting are operated by the circuit function such that power for the circuit function is managed by the circuit function independently of other modules and circuit functions.

13. The circuit function of claim 12, further comprising: means for operating a clock at a clock frequency that corresponds to the determined performance requirement of the circuit function.

14. The circuit function of claim 12, wherein the performance requirement of the circuit function is determined based on at least one of: a processing load of the circuit function, an amount of data flow in the circuit function, a data buffer state, a command buffer state and a percentage of idle operations.

15. The circuit function of claim 12, wherein the circuit function is one of a plurality of circuit functions and wherein the plurality of circuit functions is located in at least one integrated circuit.

16. The circuit function of claim 12, wherein the circuit function comprises a first circuit function of a plurality of circuit functions in an apparatus, wherein the plurality of circuit functions further comprises a second circuit function, the second circuit function comprising:
   second means for determining a performance requirement of the second circuit function; and
   second means for selecting at least one power bus from the plurality of power buses, wherein the selected at least one power bus provides the determined performance requirement with a smallest amount of power relative to other one or ones of the plurality of power buses, where the second means for determining and the second means for selecting are operated by the second circuit function such that power for the second circuit function is managed by the second circuit function independently of other modules and circuit functions.

17. The circuit function of claim 12, wherein the circuit function comprises one component of a plurality of components in an apparatus and wherein the means for determining and the means for selecting of the circuit function do not perform the steps of determining and selecting for another component of the apparatus.

18. A circuit function comprising:
   a load analyzer configured to determine a performance requirement of the circuit function; and
   a power control configured to select at least one power bus from a plurality of power buses, wherein each power bus of the plurality of power buses has a different voltage and wherein the selected at least one power bus provides the determined performance requirement with a smallest amount of power relative to other one or ones of the plurality of power buses, where the load analyzer and the power control are operated by the circuit function such that power for the circuit function is managed by the circuit function independently of other modules and circuit functions.

19. The circuit function of claim 18, further comprising: a clock and a clock control configured to operate the clock at a clock frequency that corresponds to the determined performance requirement.

20. The circuit function of claim 18, wherein the performance requirement is determined based on at least one of: a processing load of the circuit function, an amount of data flow in the circuit function, a data buffer state, a command buffer state and a percentage of idle operations.

21. The circuit function of claim 18, wherein the circuit function is one of a plurality of circuit functions and wherein the plurality of circuit functions is located in at least one integrated circuit.

22. The circuit function of claim 18, wherein the circuit function comprises a first circuit function of a plurality of circuit functions in an apparatus, wherein the plurality of circuit functions further comprises a second circuit function, the second circuit function comprising:

a second load analyzer configured to determine a performance requirement of the second circuit function; and a second power control configured to select at least one power bus from the plurality of power buses, wherein the selected at least one power bus provides the determined performance requirement with a smallest amount of power relative to other one or ones of the plurality of power buses, where the second load analyzer and the second power control are operated by the second circuit function such that power for the second circuit function is managed by the second circuit function independently of other modules and circuit functions.

23. The circuit function of claim 18, wherein the circuit function comprises one component of a plurality of components in an apparatus and wherein the load analyzer and the power control of the circuit function do not perform the steps of determining and selecting for another component of the apparatus.

* * * * *